United States Patent
Yamada

(10) Patent No.: US 9,843,277 B2
(45) Date of Patent: Dec. 12, 2017

(54) MOTOR CONTROLLER HAVING A POWER-SAVING CONTROL, AND A MOTOR CONTROL SYSTEM INCLUDING THE MOTOR CONTROLLER

(71) Applicant: DENSO CORPORATION, Kariya, Aichi-pref. (JP)

(72) Inventor: Jun Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 70 days.

(21) Appl. No.: 14/934,205

(22) Filed: Nov. 6, 2015

(65) Prior Publication Data

US 2016/0141981 A1    May 19, 2016

(30) Foreign Application Priority Data

Nov. 19, 2014  (JP) ................................ 2014-234142

(51) Int. Cl.
| | |
|---|---|
| *H02P 6/00* | (2016.01) |
| *H02P 3/06* | (2006.01) |
| *H02P 6/24* | (2006.01) |
| *F16H 63/48* | (2006.01) |

(52) U.S. Cl.
CPC ................ *H02P 3/06* (2013.01); *H02P 6/001* (2013.01); *H02P 6/003* (2013.01); *H02P 6/24* (2013.01)

(58) Field of Classification Search
CPC ..... H02P 3/06; H02P 6/00; H02P 3/00; G05B 19/23
See application file for complete search history.

(56) References Cited

U.S. PATENT DOCUMENTS

| | | | | |
|---|---|---|---|---|
| 2001/0019252 | A1* | 9/2001 | Watanabe | F02D 11/105 318/727 |
| 2004/0200301 | A1* | 10/2004 | Amamiya | F16H 63/3466 74/335 |
| 2006/0163025 | A1* | 7/2006 | Hori | F16H 61/24 192/219.5 |
| 2007/0296372 | A1* | 12/2007 | Hori | H02P 1/163 318/716 |
| 2013/0141031 | A1* | 6/2013 | Yamada | G05B 19/4062 318/603 |
| 2013/0175963 | A1* | 7/2013 | Yamada | H02P 6/24 318/468 |
| 2014/0015467 | A1* | 1/2014 | Kimura | H02P 6/24 318/603 |

* cited by examiner

*Primary Examiner* — Eduardo Colon Santana
*Assistant Examiner* — Said Bouziane
(74) *Attorney, Agent, or Firm* — Nixon & Vanderhye PC

(57) ABSTRACT

A motor controller that is configured to switch power supply phases of the motor, to perform a limit-position abutment control by rotating the motor to a movable limit of a movable range of the rotation object to learn a reference position of the motor, perform a power-saving return control afterwards, in which a power supply to the motor is stopped, thereby returning a rotation position of the motor toward a target rotation position, and stop the rotation of the motor by simultaneously supplying power to a preset phase of the motor, when the rotation position of the motor reaches the target rotation position. In such manner, the power consumption as well as the heat generation of the motor are reduced for returning the rotation position of the motor to a preset rotation position after the abutment control of the motor.

7 Claims, 6 Drawing Sheets

FIG. 6

| F/B DRIVE WITH POWER SUPPLY PHASE SWITCH SEQUENCE OF U → UW → W → VW → V → UV ||
|---|---|
| POWER UNSUPPLIABLE STATE | 2 PHASE DRIVE POWER SUPPLY PHASE SWITCH SEQUENCE |
| (1) U PHASE POWER UNSUPPLIABLE | W → VW → V |
| (2) V PHASE POWER UNSUPPLIABLE | U → UW → W |
| (3) W PHASE POWER UNSUPPLIABLE | V → UV → U |

FIG. 7

| F/B DRIVE WITH POWER SUPPLY PHASE SWITCH SEQUENCE OF U → UV → V → VW → W → UW ||
|---|---|
| POWER UNSUPPLIABLE STATE | 2 PHASE DRIVE POWER SUPPLY PHASE SWITCH SEQUENCE |
| (4) U PHASE POWER UNSUPPLIABLE | V → VW → W |
| (5) V PHASE POWER UNSUPPLIABLE | W → UW → U |
| (6) W PHASE POWER UNSUPPLIABLE | U → UV → V |

MOTOR CONTROLLER HAVING A POWER-SAVING CONTROL, AND A MOTOR CONTROL SYSTEM INCLUDING THE MOTOR CONTROLLER

CROSS REFERENCE TO RELATED APPLICATION

The present application is based on and claims the benefit of priority of Japanese Patent Application No. 2014-234142, filed on Nov. 19, 2014, the disclosure of which is incorporated herein by reference.

TECHNICAL FIELD

The present disclosure generally relates to a motor controller for controlling a motor under a power-saving control that serves as a drive power source of a control object, and a motor control system including the motor controller.

BACKGROUND INFORMATION

In recent years, mechanical drive systems in vehicles are gradually replaced with electrical drive-by-wire systems, for space efficiency, ease of assembly, controllability and the like, in which the mechanism of the drive system is driven by motors. One of the examples of such replacement is found in a field of automatic transmission, or more practically, a range switching mechanism driven by a motor, as disclosed in a patent document, JP 2004-308846 A (patent document 1). In such a system, the drive control of the motor is performed based on an encoder count (i.e., by counting the number of pulse signals from an encoder in the motor), and the motor is rotated to a target rotation position that corresponds to the target range (i.e., the motor is drive to the target encoder count), for the switching of the shift ranges. Here, the shift ranges may also be understood as the shift positions of the automatic transmission.

In the above-described system or the like, the reference position of the rotation position of the motor is learned for the rotation control of the motor by an abutment control, in which the motor is rotated to operate the range switch mechanism to the limit position of the movable/rotatable range (i.e., to one of two walls on both ends of rotatable range), for the learning of such position as a reference position, as is disclosed in the patent document 1. However, in such an abutment control, the rotation transmission mechanism is resiliently twisted by the motor torque when the motor is rotated to move the range switch mechanism to the limit position, in which a detent spring or the other parts may be twisted or warped or pulled (i.e., resiliently deformed), from the original shape, for example. Therefore, in the above-described system in the patent document 1, after the motor is rotated to the limit position, the motor is rotated in a reverse direction that is an opposite rotation direction relative to the rotation in the abutment control, for the motor rotation position of rotating the range switch mechanism to the limit position to be returned by a preset rotation amount from such position and for the resolving/cancelling of the resilient deformation of the rotation transmission system that has been rotated to the limit position. The power supply to the motor is stopped after such a return control for returning the rotation position of the motor from the limit position.

In recent years, a fuel efficiency of the vehicle and improvement in reliability are in high demand. However, in the technique described in the patent document 1, the return control of the motor after the abutment control uses an electric power supplied from the battery, for the rotation of the motor in the reverse direction, which means that the electric power consumption and heat generation are both increased from such a return control of the motor and the fuel efficiency and reliability of the system may thus be deteriorated.

SUMMARY

It is an object of the present disclosure to provide a motor controller that returns a motor rotation position to a preset position after an abutment control while reducing a power consumption and heat generation of a motor than a conventional controller.

In an aspect of the present disclosure, a motor controller includes a motor rotating a rotation object, and a control section including a microcomputer that is configured to switch power supply phases of the motor to rotationally drive the motor. The control section is also configured to perform a limit-position abutment control by rotating the motor to a movable limit of a movable range of the rotation object to learn a reference position of the motor, perform a power-saving return control after performing the limit-position abutment control, in which a power supply to the motor is stopped, thereby returning a rotation position of the motor toward a target rotation position with a reverse rotation relative to a rotation in the limit-position abutment control, and stop the rotation of the motor by simultaneously supplying power to a preset phase of the motor, when the rotation position of the motor reaches the target rotation position after a start of the power-saving return control.

When the abutment control of the motor is performed (i.e., when the motor is rotated to the limit position that is a limit position of a rotatable range of the control object), the motor torque resiliently twists or warps the rotation transmission mechanism (i.e., resiliently deforms the mechanism). That is, for example, a detent spring or the like may be deformed compressively or expansively when the motor is rotated to the limit position. Therefore, such a resilient deformation of the mechanism returns to a non-deformed state, thereby releasing the resilient force in the course of returning to the non-deformed state, which rotates the motor in a reverse direction of the abutment control.

By taking advantage of such a resilient force, the motor controller in the present disclosure returns the motor (i.e., rotates the motor back) to the target rotation position by a power-saving return control that saves the electric power, in which the electric power otherwise supplied to the motor for the reverse rotation after the abutment control is saved (i.e., is stopped). Then, upon having the motor rotated back to the target rotation position after the start of the power-saving return control, the rotation of the motor is stopped at the target rotation position by supplying the electric power to a preset phase of the motor, which securely stops the rotation of the motor at the target rotation position. Therefore, in comparison to the conventional motor controller that returns the motor after the abutment control to the target rotation position by supplying the electric power to the motor for the reverse rotation, the motor controller of the present disclosure achieves the same goal (i.e., back-to-target-position rotation control), in a less energy consuming and less heat generating manner after the abutment control, which is advantageous in terms of fuel consumption of the vehicle, reliability improvement (i.e., an overheat protection) and the like.

BRIEF DESCRIPTION OF THE DRAWINGS

Objects, features, and advantages of the present disclosure will become more apparent from the following detailed description made with reference to the accompanying drawings, in which:

FIG. 6 is an illustration of a power supply phase switch sequence in a two phase drive; and FIG. 7 is an illustration of the power supply phase switch sequence in the two phase drive.

DETAILED DESCRIPTION

Embodiments of the present disclosure are described in the following as to more concretely showing how the present disclosure works.

(First Embodiment)

The first embodiment of the present disclosure is described based on FIGS. 1 thru 4.

Figure 1:
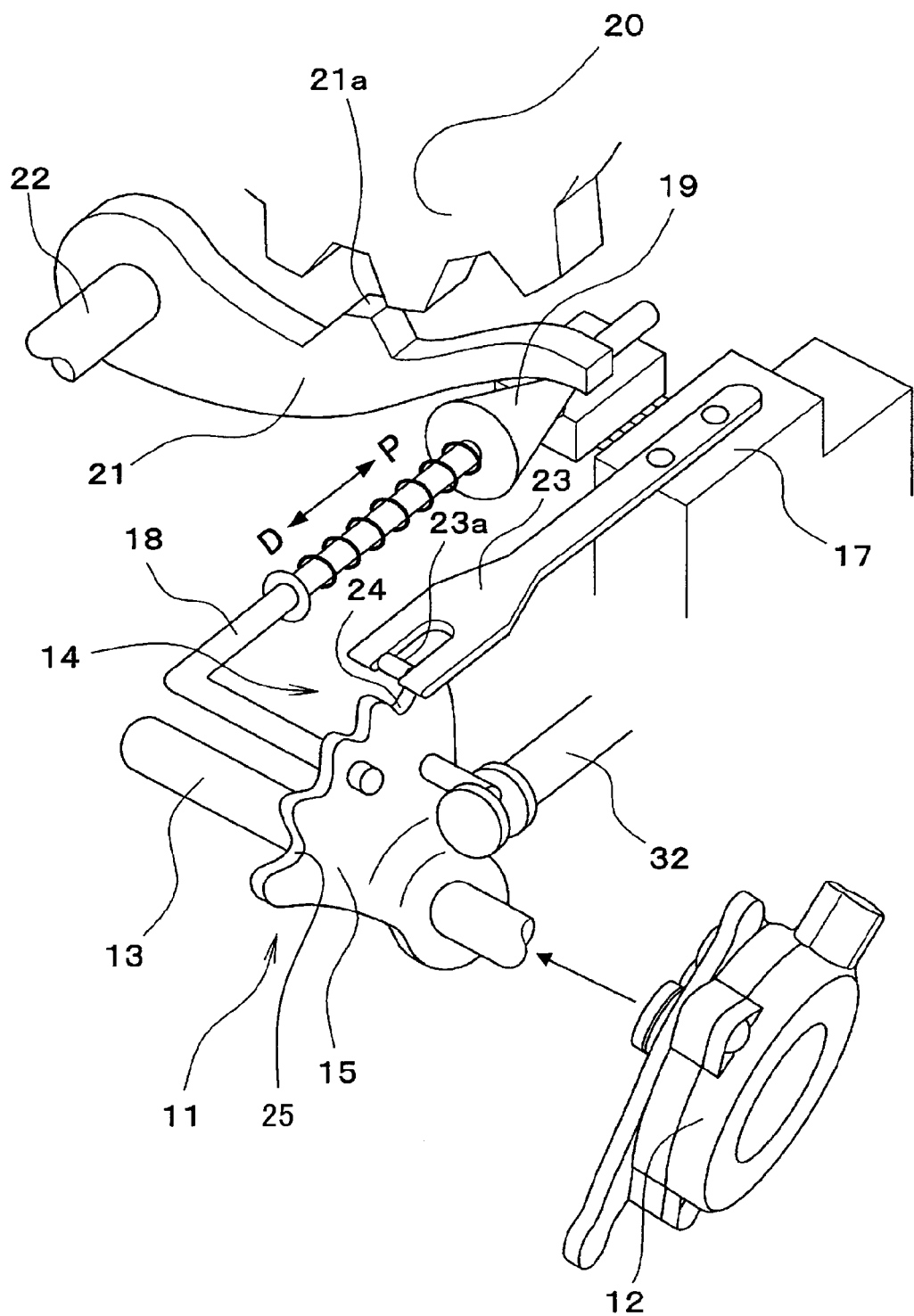
FIG. 1 is a perspective view of a range switch mechanism in a first embodiment of the present disclosure.
Figure 2:
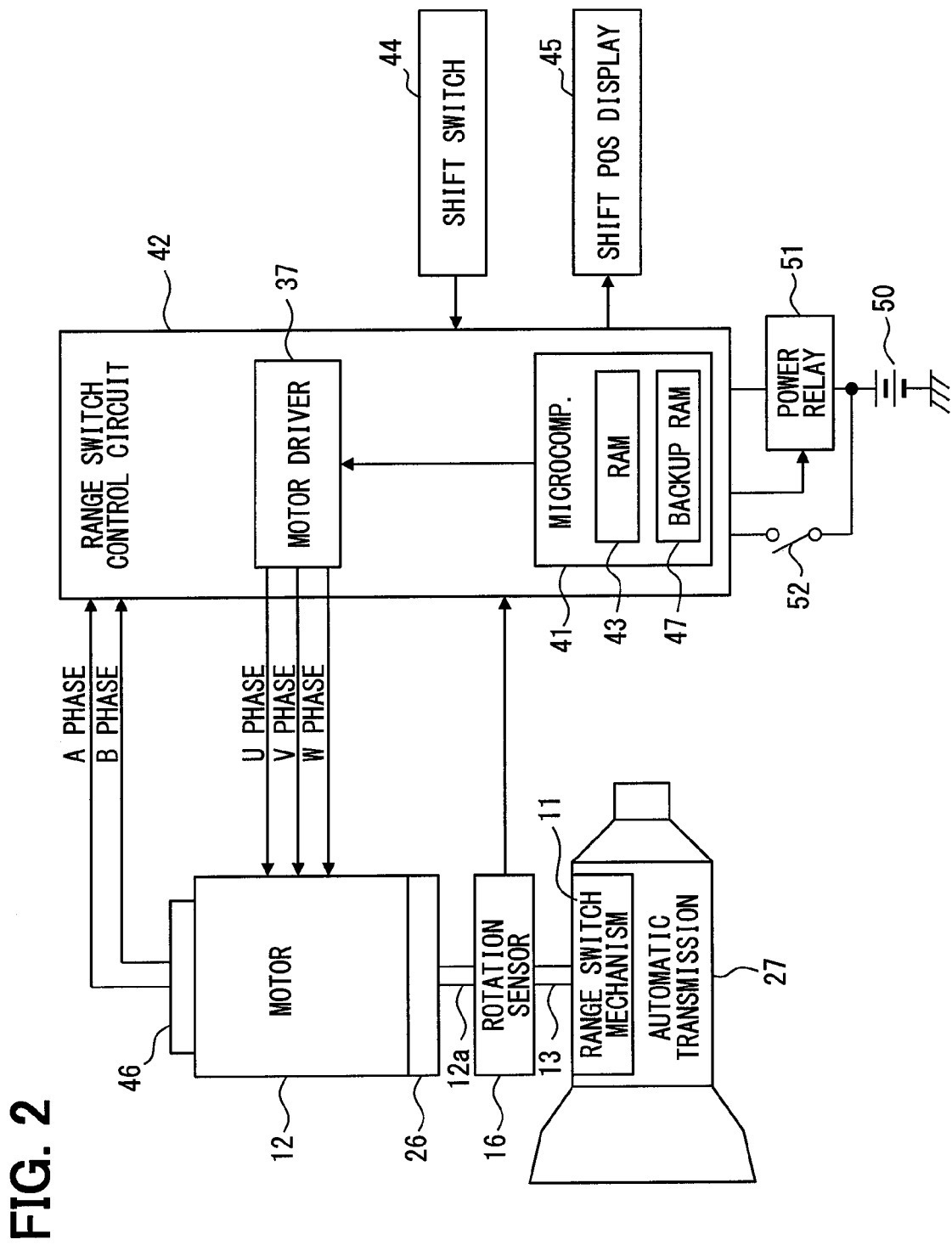
FIG. 2 is a block diagram of a range switching control system in the first embodiment of the present disclosure.

First, a configuration of a range switching control system is described based on FIGS. 1 and 2.

As shown in FIG. 1, a range switch mechanism 11 is a range switch mechanism with four shift positions, which switches the four shift ranges (i.e., the shift positions) of an automatic transmission 27 (see FIG. 2) disposed in the vehicle among P position (i.e., a parking position), R position (i.e., a reverse position), N position (i.e., a neutral position), and D position (i.e., a drive position). A motor 12, which is used as a driving power source of the range switch mechanism 11, is implemented as a switched-reluctance motor, for example. A speed reducer 26 (see FIG. 2) is built in the motor 12, and a manual shaft 13 of the range switch mechanism 11 is connected to an output shaft 12a of the motor 12 (see FIG. 2). A detent lever 15 is fixed to the manual shaft 13.

A manual valve 32 connected to the detent lever 15 moves linearly (i.e., performs a translational movement), according to the rotation of the lever 15, and a shift position of the switch mechanism 11 is switched by switching a hydraulic circuit (not shown) inside the automatic transmission 27 with this manual valve 32.

A parking rod 18 of L shape is fixed onto the detent lever 15, and a cone shape body 19 disposed at a tip point of the parking rod 18 is in contact with a locking lever 21. The locking lever 21 moves up and down about a shaft 22 according to the position of the cone shape body 19, for locking and releasing a lock of a parking gear 20. The parking gear 20 is disposed on an output shaft of the automatic transmission 27, and when the parking gear 20 is locked with the locking lever 21, a drive wheel of the vehicle is held in a locked state (i.e., in a parking state).

On the other hand, a detent spring 23 for holding the detent lever 15 in each of four positions (i.e., in the P/R/N/D position) is fixed onto a support base 17, and a P position holding concave 24 as well as other concaves 24 for the R, N, D positions are provided on the detent lever 15. When an engagement part 23a provided at the tip of the detent spring 23 fits into one of the P/R/N/D position holding concaves 24 of the detent lever 15, the detent lever 15 is held in one of the P/R/N/D positions. By having the above-described components (i.e., the detent lever 15, the detent spring 23 and the like), a detent mechanism 14 engagingly holds a rotation position of the detent lever 15 in one of those shift positions (i.e., the range switch mechanism 11) is held in one of the four shift positions.

In the P position, the parking rod 18 moves in one direction, approaching the locking lever 21, and a thick portion of the cone shape body 19 pushes up the locking lever 21, and a convex part 21a of the locking lever 21 engages the parking gear 20 for holding the parking gear 20 in a locked state. In such manner, the output shaft of the automatic transmission 27 (i.e., a drive wheel) is held in a locked state (i.e., in a parking state).

On the other hand, in the Not-P position, the parking rod 18 moves away from the locking lever 21, and the thick portion of the cone shape body 19 is pulled out from the locking lever 21 for releasing the parking gear 20 from the locked state, thereby holding the output shaft of the automatic transmission 27 in a rotatable state (i.e., in a travelable state).

As shown in FIG. 2, a rotation sensor 16 that detects a rotation angle (i.e., a rotation position) of the manual shaft 13 is provided on the manual shaft 13 of the range switch mechanism 11. The rotation sensor 16 is constituted by a device that outputs a voltage according to the rotation angle of the manual shaft 13 (e.g., potentiometer), for an assurance or a confirmation of whether an actual shift position is in the P position or one of the other positions of R, N, D based on the output voltage of the potentiometer.

As shown in FIG. 2, an encoder 46 for detecting the rotation angle (i.e., the rotation position) of a rotor is disposed on the motor 12. The encoder 46 is constituted as a rotary encoder of the magnetic type, for example, and it is configured so that a pulse signal of an A phase and of a B phase having a preset phase difference is output in synchronization with a rotation of the rotor of the motor 12 at every given angle.

A microcomputer 41 (i.e., a controller or a control section) having both a Random Access Memory (RAM) 43 and a backup RAM 47 within a range switch control circuit 42 counts both edges (i.e., a rising edge and a falling edge) of the A phase signal and the B phase signal that are outputted from the encoder 46, and drives (i.e., rotates) the motor 12 by switching a power supply phase of the motor 12 in a preset order by using a motor driver 37 according to the counted value (i.e., according to an encoder count). In such a case, a combination of winding wires of three phases (i.e., U/V/W phases) and the motor driver 37 may be provided in two systems, for a redundancy and a failsafe configuration (i.e., for a continuation of the rotation of the motor 12 even when one system fails in a breakdown).

During the rotation of the motor 12, based on an order of generation of the A phase signal and the B phase signal, a rotation direction of the motor 12 is determined, and during a forward rotation of the motor 12 (i.e., a rotation from the P position to the D position), the encoder count is counted up, and during a reverse rotation of the motor 12 (i.e., a rotation from the D position to the P position), the encoder count is counted down.

In such manner, whichever the rotation direction of the motor 12 may be, the encoder count and the rotation angle of the motor 12 match and are maintained, thereby (i) enabling a detection of the rotation position of the motor 12 based on the encoder count and (ii) enabling a rotation drive of the motor 12 according to the switching of the power supply to the winding wire of a corresponding phase of the detected rotation position.

A signal indicative of an operation position of the shift lever detected with a shift switch 44 is input to the range switch control circuit 42.

By an input of such a signal, the microcomputer 41 of the range switch control circuit 42 switches a target position according to a driver's operation of the shift lever or the like, and the motor 12 is driven (i.e., is rotated to the target position) for a switching of the shift positions, and the actual shift position after such a switching of the shift positions is displayed on a shift position display screen 45, which is provided on an instrument panel (not illustrated).

A power supply voltage is supplied to the range switch control circuit 42 via a power relay 51 from a battery 50 (i.e., from a power supply) in the vehicle. ON and OFF of the power relay 51 is switchable by manually switching ON and OFF of an Ignition (IG) switch 52, which serves as a power switch. When the IG switch 52 is turned ON, the power relay 51 is turned ON and the power supply voltage is supplied to the range switch control circuit 42, and when the IG switch 52 is turned OFF, the power relay 51 is turned OFF and the power supply to the range switch control circuit 42 is intercepted (i.e., turned OFF).

In terms of turning OFF of the power supply, the encoder count memorized in a Random Access Memory (RAM) of the microcomputer 41 is lost when the power supply for the range switch control circuit 42 is turned OFF. Therefore, the encoder count immediately after a power ON of the range switch control circuit 42 does not match (i.e., does not represent) the rotation position of the motor 12 (i.e., does not correspond to the power supply phase). Therefore, for the switching of the power supply phase according to the encoder count, the actual rotation position of the motor 12 has to be immediately matched to the encoder count after the power ON of the circuit 42, for the matching therebetween (i.e., for a corresponding relation between the encoder count and the power supply phase).

Thus, the microcomputer 41 performs an initial drive after a power ON of the power supply of the motor 12, for the learning of a matching relation between the power supply phase and the encoder count. In the initial drive, an open-loop control is performed for one cycle of the switching of the power supply phase of the motor 12 according to a certain time schedule, (i) for finding a matching relation between the rotation position of the motor 12 and one of the power supply phases and (ii) for counting the edges of the A/B phase signals, thereby, at the end of the initial drive, establishing/learning the matching among (a) the encoder count, (b) the rotation position of the motor 12 and (c) the power supply phase.

Further, the microcomputer 41 simply relies on an after-power-ON encoder count for detecting an after-power-ON rotation amount (i.e., a rotation angle) for the control of the motor 12, thereby making it necessary by itself to detect an absolute rotation position of the motor 12 in one way or the other at some point after the power ON, for accurately controlling the motor 12 to rotate to the target rotation position.

Therefore, after the end of the initial drive, the microcomputer 41 rotates the motor 12 to an abutment position, defining a limit of rotation (i.e., movable range) for the range switch mechanism 11, and learns such an abutment position as a reference position, for controlling the rotation amount (i.e., the rotation angle) of the motor 12, with reference to an encoder count of such a reference position.

More practically, a "P wall abutment control" is performed, in which the motor 12 is rotated until the engagement part 23*a* of the detent spring 23 abuts on a P wall (i.e., a side wall of the P position holding concave 24), which is a P position side limit of the movable range of the range switch mechanism 11, for the learning of a P position side reference position.

Alternatively, a "D wall abutment control" is performed, in which the motor 12 is rotated until the engagement part 23*a* of the detent spring 23 abuts on a D position wall (i.e., a side wall of a D position holding concave 25), which is a D position side limit of the movable range of the range switch mechanism 11, for the learning of a D position side reference position.

Once the learning of the reference position is complete, the microcomputer 41 changes a target rotation position (i.e., a target count) according to the switching of the target shift position when the driver operates a shift lever or the like for the switching of the shift positions. Then, the microcomputer 41 performs a feedback control for rotating the motor 12 to the target rotation position that corresponds to the target shift position, by sequentially switching the power supply phases based on the encoder count (i.e., for switching the positions of the range switch mechanism 11 to the target shift position). The feedback control may also be designated as a feedback drive in the following description.

When the abutment control is performed by rotating the motor 12 to the limit position (i.e., to move the range switch mechanism 11 to the limit position of the rotatable range), the motor torque resiliently deforms the mechanism 11 (e.g., the parts such as the detent spring 23 in the mechanism 11 is twisted or warped or pulled. Therefore, in the conventional control, the motor 12 is rotated in reverse after the abutment control by a preset amount as a return control (i.e., rotating backward relative to the rotation in the abutment control), for the resolution of the resilient deformation of the mechanism 11.

However, as described in the background section, in the conventional return control that is performed after performing the abutment control for returning the rotation position of the motor 12 by a preset amount, the electric power is supplied to the motor 12 for the reverse rotation, which increases the power consumption by the motor 12, and increases heat generation, resulting in a deterioration of the fuel efficiency and reliability (i.e., the mechanism 11 may become more prone to overheating.

Figure 4:
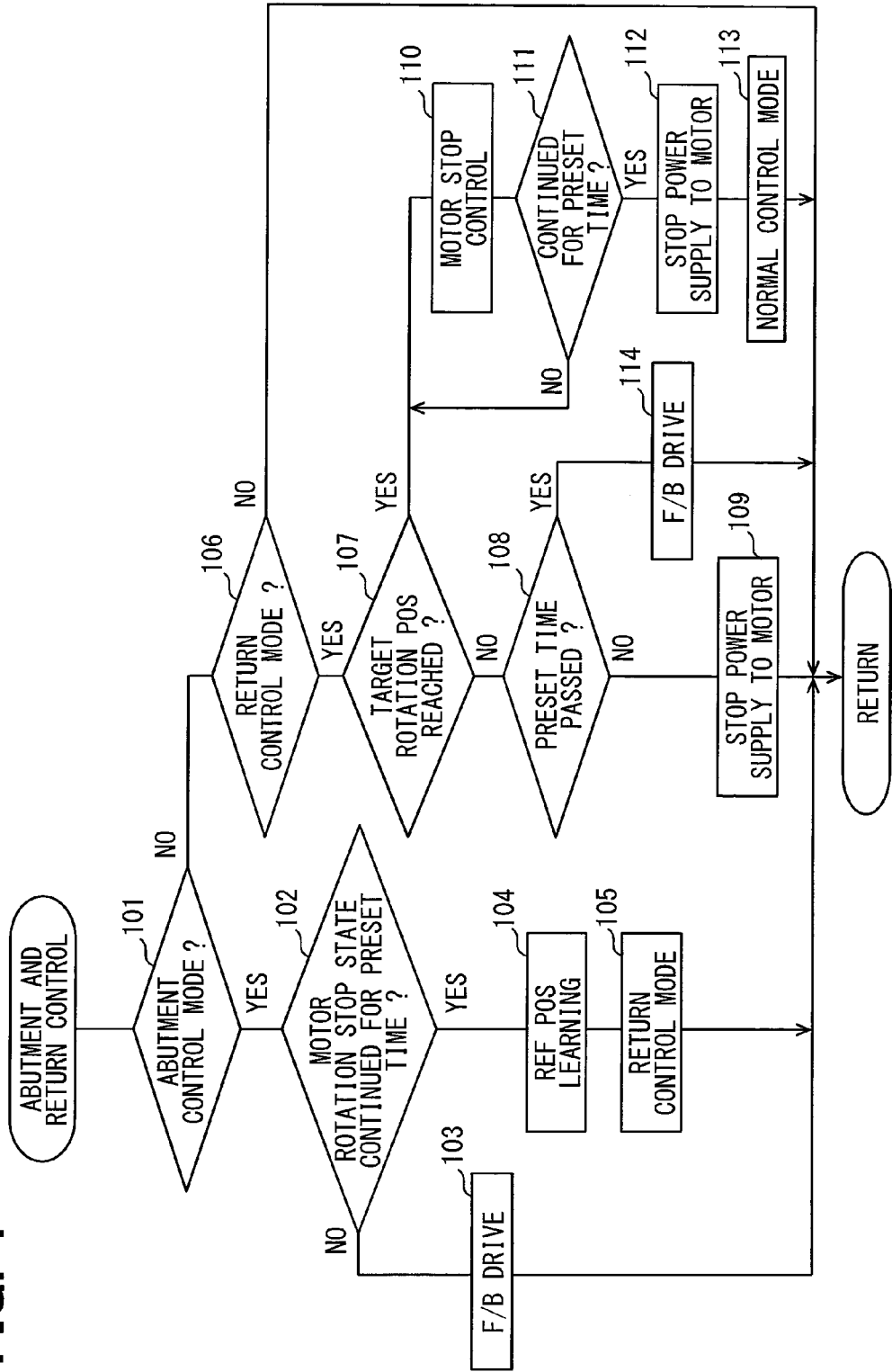
FIG. 4 is a flowchart of an abutment and return control process of a control program in the first embodiment of the present disclosure.

Therefore, in the first embodiment of the present disclosure, the microcomputer 41 of the range switch control circuit 42 performs the process shown in FIG. 4, for performing a power-saving return control that rotates the rotation position of the motor 12 in reverse (i.e., back to the target rotation position), by stopping the power supply to the motor 12 after performing the abutment control.

When the motor 12 is rotated by the abutment control, to the limit position, which is a limit position of the rotatable range of the range switch mechanism 11, the motor torque resiliently twists or warps the rotation transmission mechanism (i.e., resiliently deforms the mechanism 11), which stores the resilient force in the compressively or expansively deformed detent spring 23 or the like. Therefore, the resilient force is released from the detent spring to restore the original shape of the detent spring 23 which then rotates the motor 12 in reverse relative to the abutment control. Further, a pulling force of the detent mechanism 14 slidably pulls the engagement part 23*a* of the detent spring 23 toward the bottom of the position holding concave 24 is also added to rotate the motor 12 in reverse.

By taking advantage of such a resilient force and a pulling force, the control in the present disclosure returns the rotation position of the motor back to the target rotation position by the power-saving return control that saves the electric power (i.e., by stopping the supply of the electric power to the motor 12 after the abutment control).

Figure 3:
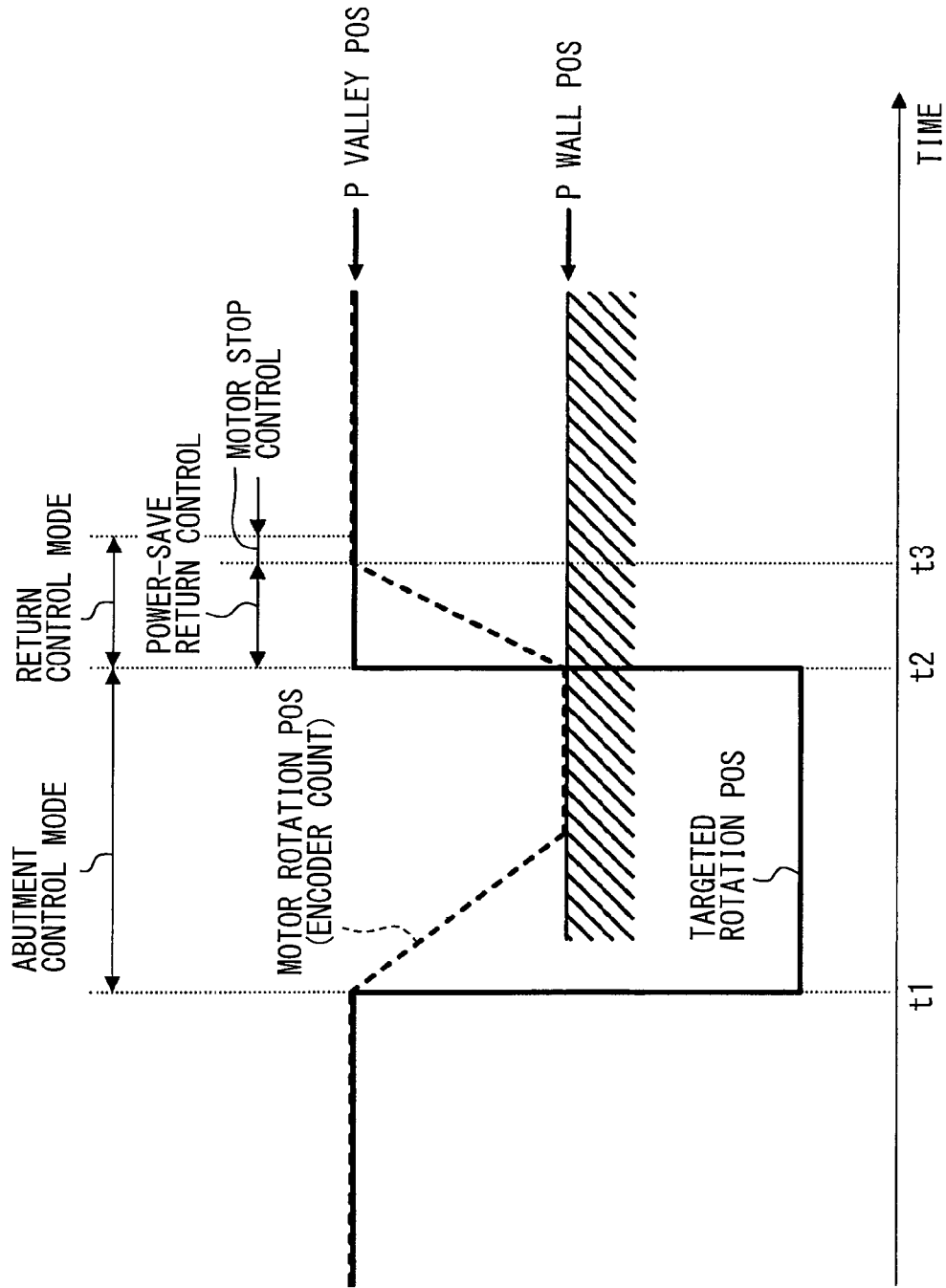
FIG. 3 is a time diagram of a power-saving return control.

More practically, as shown in FIG. 3, when a control mode is switched to an abutment control mode (e.g., a P wall abutment control mode), at time t1 of such a switching of the control mode, the target rotation position (i.e., a target count) of the motor 12 is set to a far-beyond position of P position wall (i.e., to a small value that is sufficiently smaller than a P position wall corresponding value), and the P wall abutment control is performed. In such P wall abutment control, the motor 12 is rotated to the target rotation position by a feedback drive, in which the power supply phases of the motor 12 are sequentially switched based on the encoder count, which ultimately abuts the engagement part 23a of the detent spring 23 to the limit position on the P position side (i.e., to the P position wall).

Then, at time t2, which is after a lapse of preset time from the stop of the rotation of the motor 12, it is determined that the motor 12 is rotated to the limit position on the P position side (i.e., it is determined that the engagement part 23a of the detent spring 23 has abutted on the P position wall), the limit position on the P position side is learned as a reference position, and then the control mode is switched from the abutment control mode to the return control mode.

When the control mode is switched to the return control mode, the target rotation position of the motor 12 is switched to a P valley position (i.e., a position where the engagement part 23a of the detent spring 23 is pulled to the bottom of the P range holding concave part 24), and the power-saving return control is performed. In the power-saving return control, the power supply to the motor 12 is stopped, and the motor 12 is rotated in reverse relative to the abutment control by the resilient force, and the pulling force from the rotation transmission system and from the detent mechanism 14, toward the target rotation position.

Then, at time t3 when the rotation position of the motor 12 reaches the target rotation position after the start of the power-saving return control, the electric power is supplied to a preset phase of the motor 12 to stop the rotation of the motor 12 (i.e., for a motor stop control). In the motor stop control, the electric power is supplied to two phases of the motor 12 at the same time, for stopping the motor at the target rotation position (i.e., two phase power supply). Alternatively, all three phases of the motor 12 may have the power supply at the same time (i.e., three phase power supply) or only one phase of the motor 12 may have the power supply, for stopping the rotation of the motor 12 at the target rotation position.

If a preset time has lapsed before the rotation position of the motor 12 reaches the target rotation position after the start of the power-saving return control, it is determined that the motor 12 cannot be rotated to the target rotation position only by the power-saving return control. In such case, the feedback drive of the motor 12 is performed, in which the motor 12 is rotated toward the target rotation position by sequentially switching the power supply phases based on the encoder count. In such a feedback drive, when the rotation position of the motor 12 reaches the target rotation position, the motor stop control is performed to stop the motor 12 at the target rotation position.

With reference to FIG. 4, an abutment and return control process of the first embodiment that is performed by the microcomputer 41 of the range switch control circuit 42 is described.

The abutment and return control process in FIG. 4 is repeatedly performed by the microcomputer 41 at a preset interval during a power ON period of the range switch control circuit 42. When the process is started, first in step 101, it is determined whether a control mode is an abutment control mode (e.g., a P wall abutment control mode).

When it is determined that the control mode is the abutment control mode in step 101, the target rotation position of the motor 12 is set to a far-beyond position of the P position wall (i.e., an encoder count being set to a small value that is sufficiently smaller than a P position wall corresponding value), for performing the P wall abutment control in the following manner.

First, when the process proceeds to step 102, it is determined whether a motor rotation stop state has been continued for a preset time (i.e., whether the rotation of the motor 12 is in a stopped state for a preset period of time). When it is determined that the motor rotation stop state has not been continued for a preset time, the process proceeds to step 103, and a P wall abutment control is performed. In such P wall abutment control, the feedback drive is performed in which the power supply phases of the motor 12 are sequentially switched to rotate the motor 12 toward the target rotation position, and the motor 12 is rotated so that the engagement part 23a of the detent spring 23 abuts on the limit position (i.e., on the P position wall).

Thereafter, when it is determined that the motor rotation stop state has been continued for the preset time in step 102 described above, it is interpreted that the motor 12 is rotated to the limit position on the P position side (i.e., the engagement part 23a of the detent spring 23 is abutting on the limit position), the process proceeds to step 104, and the limit position on the P position side is learned as a P position side reference position. Then, the process proceeds to step 105, and the control mode is switched from the abutment control mode to a return control mode.

If it is determined in step 101 described above that the control mode is not the abutment control mode, the process proceeds to step 106, and it is determined whether the control mode is the return control mode.

In step 106, when it is determined that the control mode is the return control mode, the target rotation position of the motor 12 is switched to the P valley position (i.e., a position where the engagement part 23a of the detent spring 23 is pulled to the bottom of the P range holding concave part 24), and the power-saving return control is performed in the following manner.

First, at step 107, it is determined whether the rotation position of the motor 12 has reached the target rotation position. When it is determined that the rotation position of the motor 12 has not reached the target rotation position, the process proceeds to step 108, where it is determined whether a preset time has passed from the switching to the return control mode.

When, in step 108, it is determined that the preset time has not yet passed from the switching to the return control mode, the process proceeds to step 109, and the power-saving return control is performed. In the power-saving return control, by stopping the power supply to the motor 12, the motor 12 is rotated back to the target rotation position by the resilient force and the pulling force, from the rotation transmission system, and from the detent mechanism 14, which rotates the motor 12 in reverse relative to the abutment control.

Upon determining in step 107 that the rotation position of the motor 12 is determined to have reached the target rotation position, the process proceeds to step 110, and the electric power is supplied to a preset phase of the motor 12 to stop the rotation of the motor 12 (i.e., the motor stop control is performed). The motor stop control in this case supplies the electric power to the two phases of the motor 12 at the same time for stopping the motor 12 at the target rotation position. Alternatively, all three phases of the motor 12 may have the power supply at the same time (i.e., three phase power supply) or an only one phase of the motor 12 may have the power supply, for stopping the rotation of the motor 12 at the target rotation position.

Then, after proceeding to step 111, it is determined whether the motor stop control is continued for a preset time. When it is determined that the motor stop control has not yet been continued for a preset time, the process returns to the above-mentioned step 110, and the motor stop control is continued.

Thereafter, upon determining that the motor stop control has continued for a preset time in the above-mentioned step 111, the process proceeds to step 112, and the motor stop control is finished by stopping the power supply to the motor 12. Then, the process proceeds to step 113, and the control mode is switched from the return control mode to a normal control mode.

If, in the above-mentioned step 108, it is determined that a preset time has passed from the switching to the return control mode (i.e., when, after the start of the power-saving return control, a preset time has passed before the rotation position of the motor 12 reaches the target rotation position), it is determined that the motor 12 cannot be rotated to the target rotation position only by the power-saving return control, and the process proceeds to step 114. In step 114, the feedback drive of the motor 12 is performed, in which the motor 12 is rotated toward the target rotation position by sequentially switching the power supply phases based on the encoder count.

When it is determined that the rotation position of the motor 12 has reached the target rotation position in the above-mentioned step 107, the process proceeds to the above-mentioned step 110, and the motor stop control is performed for stopping the motor 12 at the target rotation position. Then, the motor stop control is finished by stopping the power supply to the motor 12, and the control mode is switched to the normal control mode (steps 110-113).

In the present embodiment described above, by taking advantage of the rotation of the motor 12 by the resilient force of the rotation transmission system and the pulling force of the detent mechanism 14 after performing the abutment control, the power-saving return control is performed after the abutment control.

In the power-saving return control, by stopping the power supply to the motor 12, the motor 12 is rotated in reverse relative to the abutment control (i.e., returning the rotation position of the motor 12 back to the target rotation position), by utilizing the resilient force of the rotation transmission system and the pulling force of the detent mechanism 14. Then, when the rotation position of the motor 12 has reached the target rotation position after the start of the power-saving return control, the rotation of the motor 12 is securely stopped at the target rotation position by performing the motor stop control, which supplies the electric power to the preset phase of the motor 12 for stopping the motor 12.

Therefore, in comparison to the conventional system in which the motor 12 is rotated in reverse by supplying the electric power to the motor after the abutment control, the rotation position of the motor 12 is returned to the preset position after the abutment control while reducing both the power consumption and the heat generation of the motor 12. Reducing both power consumption and heat generation of the motor 12 is advantageous in terms of the fuel efficiency and the overheat protection (i.e., an improved reliability).

Further, in the first embodiment, when, after the start of the power-saving return control and a preset time has passed before the rotation position of the motor 12 reaches the target rotation position, it is determined that the motor 12 cannot be rotated to the target rotation position only by the power-saving return control, the feedback drive is performed. Here, the power supply phase of the motor 12 is sequentially switched to rotate the motor 12 toward the target rotation position. In such manner, even when the motor 12 cannot be rotated to the target rotation position by the resilient force of the rotation transmission system and the pulling force of the detent mechanism 14, the motor 12 can still be rotated to the target rotation position by the feedback drive.

(Second Embodiment)

The second embodiment of the present disclosure is described with reference to FIGS. 5 to 7. The same components and configuration are omitted or simplified in the following description and the focus of the description is put on differences between the second embodiment and the first embodiment.

Figure 5:
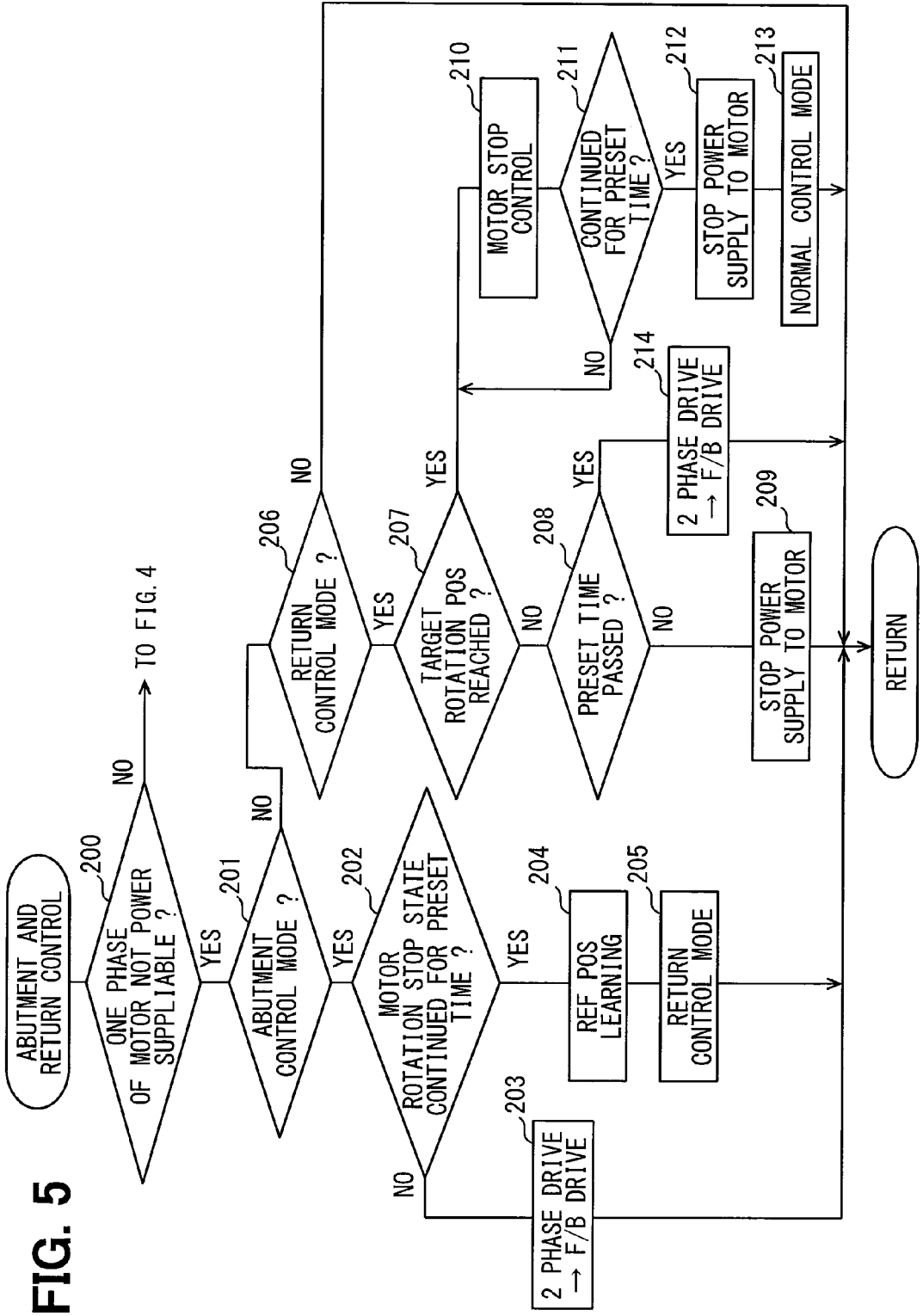
FIG. 5 is a flowchart of the abutment and return control process of the control program in a second embodiment of the present disclosure.

In the second embodiment, the abutment and return control process in FIG. 5 is performed by the microcomputer 41 of the range switch control circuit 42, which enables the power-saving return control when one of the three phases (i.e., U, V, or W phase) of the motor 12 is power unsuppliable.

FIG. 5 illustrates the contents of processing in the abutment and return control process performed by the microcomputer 41 of the range switch control circuit 42.

The process in FIG. 5 starts from step 200, determining whether the one phase (i.e., U, V, or W phase) of the motor 12 is not power suppliable (i.e., the electric power is unable to be supplied to the one phase of the motor 12, the one phase of the motor 12 malfunctions, or the one phase of the motor 12 is dysfunctional). If the determination in step 200 is negative (i.e., when it is determined that the electric power is suppliable to each of those phases), step 200 proceeds to NO branch, which leads to the process of the first embodiment shown in FIG. 4.

On the other hand, in step 200, when it is determined that one phase of the motor 12 (i.e., one of U, V, or W phase), is power unsuppliable, the process proceeds to step 201, and it is determined whether the control mode is the abutment control (e.g., the P wall abutment control mode).

In step 201, when it is determined that the control mode is the abutment control mode, the target rotation position of the motor 12 is set to the far-beyond position of the P position wall, and the P wall abutment control is performed in the following manner.

First, when the process proceeds to step 202, it is determined whether a motor rotation stop state has been continued for a preset time (i.e., whether the rotation of the motor 12 is in a stopped state for a preset period of time). When it is determined that the motor rotation stop state has not been continued for a preset time, the process proceeds to step 203, and a P wall abutment control at a one phase power unsuppliable time is performed. In such P wall abutment control at a one phase power unsuppliable time, a two phase drive to be mentioned later is performed for the rotation of the motor 12. Then, the feedback drive is performed in which the power supply phases of the motor 12 are sequentially switched to rotate the motor 12 toward the target rotation position, and the motor 12 is rotated so that the engagement part 23a of the detent spring 23 abuts on the limit position (i.e., on the P position wall).

In such feedback drive of the motor 12, if the power supply phase switch sequence (in an original feedback drive: =with no unsuppliable phase) is in an order of U→UW→W→VW→V→UV, the two phase drive shown in FIG. 6 is first performed to switch the power supply phases, and then the feedback drive is performed.

(1) When the U phase of the motor 12 is power unsuppliable, the two phase drive with a W→VW→V phase switch sequence is performed, in which each of those phase has a power supply continued for a preset period of time.

(2) When the V phase of the motor 12 is power unsuppliable, the two phase drive with a U→UW→W phase switch sequence is performed, in which each of those phase has a power supply continued for a preset period of time.

(3) When the W phase of the motor 12 is power unsuppliable, the two phase drive with a V→UV→U phase switch sequence is performed, in which each of those phase has a power supply continued for a preset period of time.

In such feedback drive of the motor 12, if the power supply phase switch sequence (in an original feedback drive: =with no unsuppliable phase) is in an order of U→UVΔV→VW→W→UW, the two phase drive shown in FIG. 7 is first performed to switch the power supply phases, and then the feedback drive is performed.

(4) When the U phase of the motor 12 is power unsuppliable, the two phase drive with a V→VW→W phase switch sequence is performed, in which each of those phase has a power supply continued for a preset period of time.

(5) When the V phase of the motor 12 is power unsuppliable, the two phase drive with a W→UW→U phase switch sequence is performed, in which each of those phase has a power supply continued for a preset period of time.

(6) When the W phase of the motor 12 is power unsuppliable, the two phase drive with a U→UV→W phase switch sequence is performed, in which each of those phase has a power supply continued for a preset period of time.

Thereafter, when it is determined that the motor rotation stop state has been continued for the preset time in step 202 described above, it is interpreted that the motor 12 is rotated to the limit position on the P position side, the process proceeds to step 204, and the limit position on the P position side is learned as a P position side reference position. Then, the process proceeds to step 205, and the control mode is switched from the abutment control mode to the return control mode.

If it is determined in step 201 described above that the control mode is not the abutment control mode, the process proceeds to step 206, and it is determined whether the control mode is the return control mode. When it is determined in step 206 that the control mode is the return control mode, the target rotation position of the motor 12 is switched to the P valley position, and the power-saving return control is performed in the following manner.

First, at step 207, it is determined whether the rotation position of the motor 12 has reached the target rotation position. When it is determined that the rotation position of the motor 12 has not reached the target rotation position, the process proceeds to step 208, where it is determined whether a preset time has passed from the switching to the return control mode.

When, in step 208, it is determined that the preset time has not yet passed from the switching to the return control mode, the process proceeds to step 209, and the power-saving return control is performed. In the power-saving return control, by stopping the power supply to the motor 12, the motor 12 is rotated back to the target rotation position by the resilient force and the pulling force, from the rotation transmission system, and from the detent mechanism 14, which rotates the motor 12 in reverse relative to the abutment control.

Upon determining in the above-described step 207 that the rotation position of the motor 12 is determined to have reached the target rotation position, the process proceeds to step 210, and the motor stop control is performed.

Then, after proceeding to step 211, it is determined whether the motor stop control is continued for a preset time. When it is determined that the motor stop control has not yet been continued for a preset time, the process returns to the above-mentioned step 210, and the motor stop control is continued.

Thereafter, upon determining that the motor stop control is continued for a preset time in the above-mentioned step 211, the process proceeds to step 212, and the motor stop control is finished by stopping the power supply to the motor 12. Then, the process proceeds to step 213, and the control mode is switched from the return control mode to the normal control mode.

If, in the above-mentioned step 208, it is determined that a preset time has passed from the switching to the return control mode (i.e., when, after the start of the power-saving return control, a preset time has passed before the rotation position of the motor 12 reaches the target rotation position), it is determined that the motor 12 cannot be rotated to the target rotation position only by the power-saving return control, and the process proceeds to step 214. In step 214, the two phase drive of the motor 12 is performed for starting the rotation of the motor 12, the motor 12 is further rotated toward the target rotation position by the feedback drive (i.e., by sequentially switching the power supply phases based on the encoder count).

In such feedback drive of the motor 12, if the power supply phase switch sequence is in an order of U→UW-→W→VW→V→UV, the two phase drive shown in FIG. 6 is first performed to switch the power supply phases, and then the feedback drive is performed. On the other hand, if the power supply phase switch sequence is in an order of U→UV→V→VW→W→UW, the two phase drive shown in FIG. 7 is first performed to switch the power supply phases, and then the feedback drive is performed.

Upon determining that the rotation position of the motor 12 has reached the target rotation position in the above-mentioned step 207, the process proceeds to the above-mentioned step 210, and the motor stop control is performed for stopping the motor 12 at the target rotation position. Then, the motor stop control is finished by stopping the power supply to the motor 12, and the control mode is switched to the normal control mode (steps 210-213).

In the second embodiment described above, when the motor 12 has one power-unsuppliable phase among other phases, the power-saving return control is performed. Thereby, the power-saving return control is performed even when the electric power is not normally suppliable to each of those phases of the motor 12, and the rotation position of the motor 12 is returned toward the target rotation position by stopping the power supply to the motor 12 (i.e., by utilizing the resilient force of the deformation of the rotation transmission system and the pulling force of the detent mechanism 14 for the rotation of the motor 12 in reverse relative to the rotation in the abutment control).

In the above-mentioned second embodiment, it is described that the power-saving return control is performed when one of the three phases of the motor 12 is power unsuppliable. However, an application of the power-saving return control is not limited to such a situation. That is, for example, when the motor 12 has four or more phases, the power-saving return control may be performed not only when one phase of the motor 12 is power unsuppliable but also when two or more phases of the motor 12 are power unsuppliable.

Further, in the above-mentioned second embodiment, the power-saving return control is performed when each of all phases of the motor 12 is power suppliable. However, the abutment control and the return control of the motor 12 may both be performed by supplying the electric power to the motor 12 when all phases of the motor 12 are power suppliable.

Further, in each of the above-mentioned first and second embodiments, the power-saving return control is performed after performing the P wall abutment control. However, the power-saving return control may be performed after performing the D wall abutment control, for example.

Further, in each of the above-mentioned first and second embodiments, when, after the start of the power-saving return control, a preset time has passed before the rotation position of the motor 12 reaches the target rotation position, the feedback drive is performed. However, in case that the motor 12 seems to be rotated to the target rotation position only by the power-saving return control (i.e., when the resilient force of the rotation transmission system and the pulling force of the detent mechanism 14 seem to be sufficient for the rotation of the motor 12 to reach the target rotation position), the feedback drive may be not performed.

Further, in each of the above-mentioned first and second embodiments, the present disclosure is applied to a system that has a range switch mechanism with four shift positions (i.e., P, R, N, D positions). However, the present disclosure may also be applicable to a system with the range switch mechanism of two shift positions (i.e., P position and Not P position), for example. Further, the present disclosure may also be applicable to a system with the range switch mechanism of three shift positions, or of five or more shift positions.

Further, the application of the present disclosure is not necessarily limited to the automatic transmission (e.g., AT, CVT, DCT, etc.), but is also feasible in a system having the transmission (i.e., a speed reducer) for an electric vehicle.

In addition, the application of the present disclosure is not necessarily limited to the range switch mechanism, but is also feasible in a system that has the position switch mechanism of various types that uses a brushless synchronous motor as its source of driving power.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A motor controller for controlling a motor rotating a rotation object, the motor controller comprising:
   a control section including a microcomputer configured to switch power supply phases of the motor to rotationally drive the motor in a first rotation direction, wherein
   the control section is configured to
      perform a limit-position abutment control by rotating the motor in the first rotation direction from a target rotation position to a movable limit of a movable range of the rotation object to learn a reference position of the motor,
      perform a power-saving return control after performing the limit-position abutment control, in which a power supply to the motor is stopped and the motor is rotationally driven by an external mechanism in a second rotation direction which is a reverse direction relative to the first rotation direction, and
      stop a rotation of the motor in the second rotation direction after the external mechanism rotationally drives the motor in the second rotation direction by supplying power to a preset phase of the motor to rotationally drive the motor in the first rotation direction, when the rotation position of the motor reaches the target rotation position after a start of the power-saving return control.

2. The motor controller of claim 1, wherein
   the control section serially switches power supply phases of the motor to rotate the motor toward the target rotation position when a preset time has elapsed before the rotation position of the motor reaches the target rotation position.

3. The motor controller of claim 1, wherein
   the control section performs the power-saving return control, when at least one of a plurality of phases of the motor is dysfunctional.

4. The motor controller of claim 1, wherein
   the rotation object is a range switch mechanism for switching a shift range.

5. The motor controller of claim 1, wherein the external mechanism is a detent spring.

6. A motor control system comprising:
   a motor rotating a rotation object; and
   a range switch control circuit including a controller and a motor driver, the controller including a microcomputer configured to switch power supply phases of the motor to rotationally drive the motor in a first rotation direction via the motor driver, based on an input for a shift switch, wherein
   the controller is configured to
   perform a limit-position abutment control by rotating the motor in the first rotation direction from a target rotation position to a movable limit of a movable range of the rotation object to learn a reference position of the motor,
   perform a power-saving return control after performing the limit-position abutment control, in which a power supply to the motor is stopped and the motor is rotationally driven by an external mechanism in a second rotation direction which is a reverse direction relative to the first rotation direction, and
   stop a rotation of the motor in the second rotation direction after the external mechanism rotationally drives the motor in the second rotation direction by supplying power to a preset phase of the motor to rotationally drive the motor in the first rotation direction, when the rotation position of the motor reaches the target rotation position after a start of the power-saving return control.

7. The motor control system of claim 6, wherein the external mechanism is a detent spring.

* * * * *